No. 888,940. PATENTED MAY 26, 1908.
E. M. TINGLEY & J. L. RAY.
DYNAMO ELECTRIC MACHINE.
APPLICATION FILED MAR. 17, 1905.
2 SHEETS—SHEET 2.
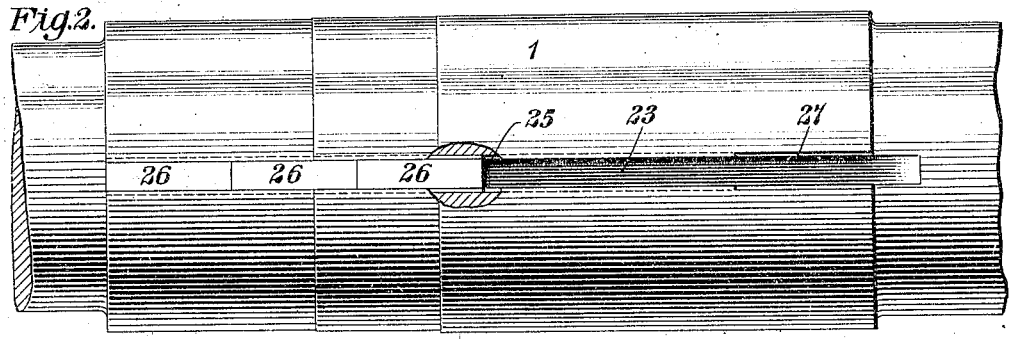
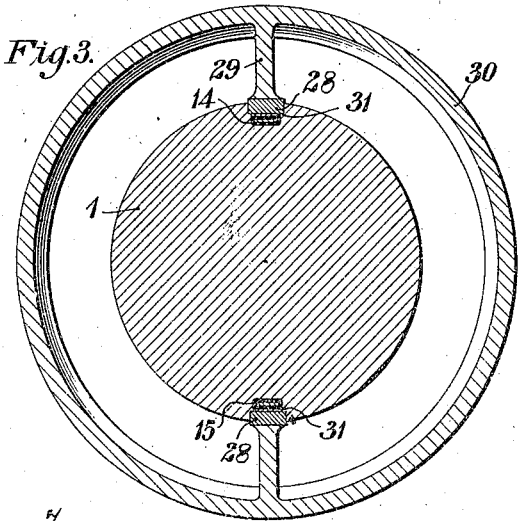
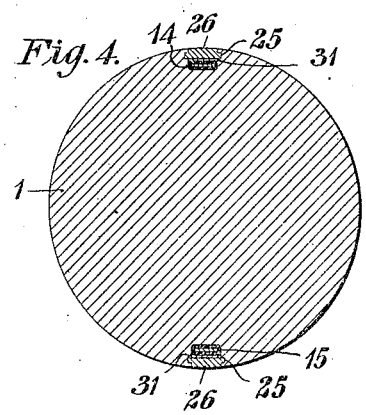
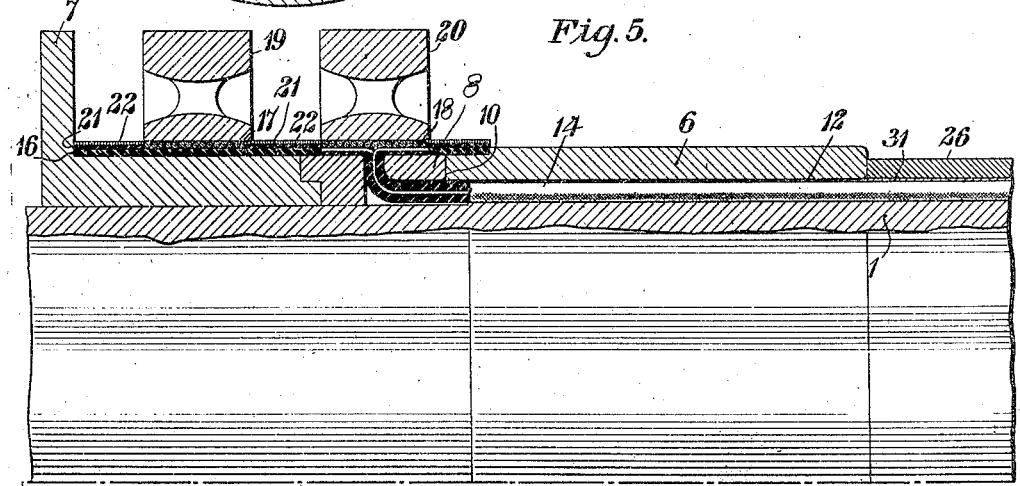
WITNESSES:
C. L. Belcher
Otto S. Schairer.
INVENTORS
Egbert M. Tingley
& Joseph L. Ray
BY
Okeley & Carr
ATTORNEY

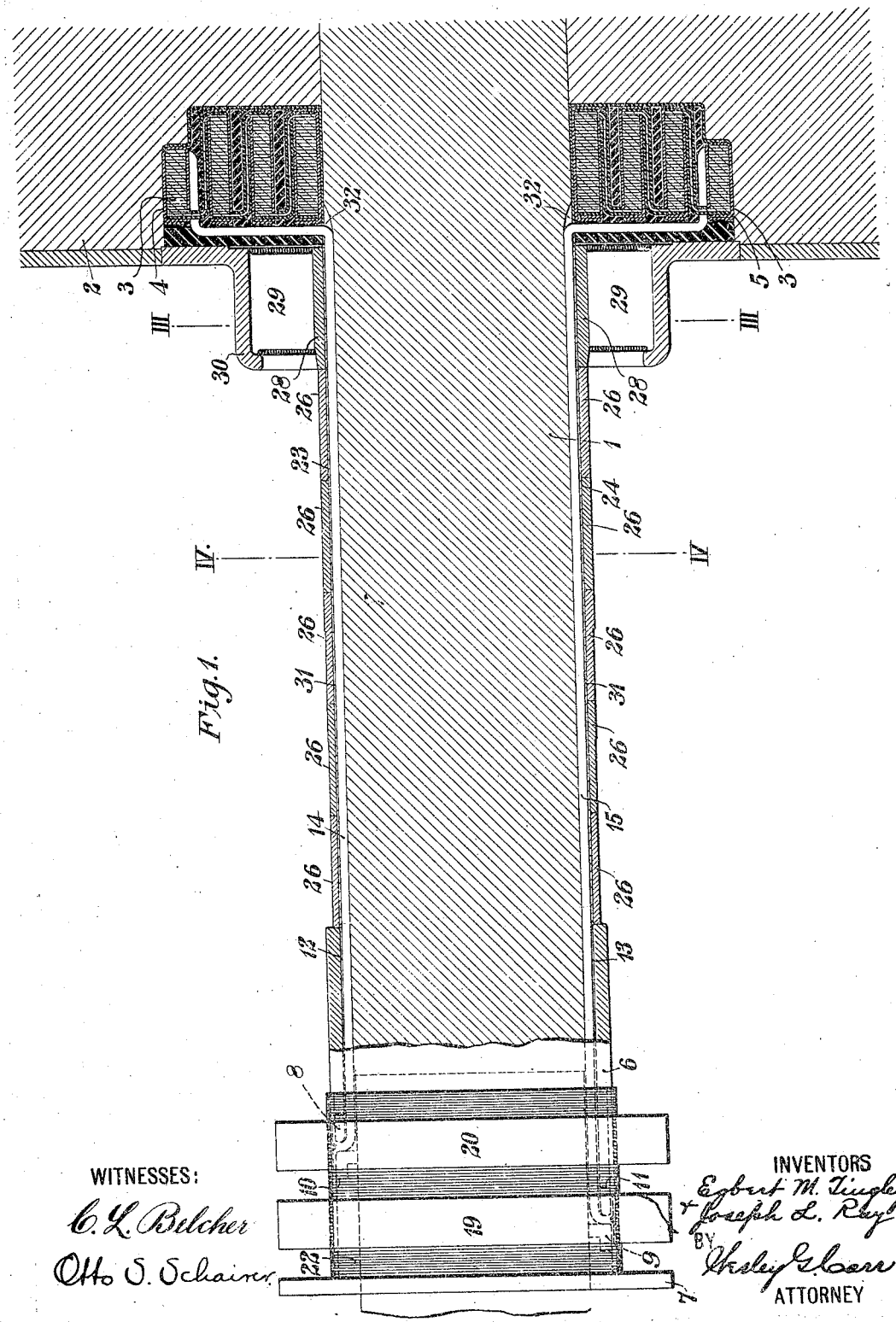

UNITED STATES PATENT OFFICE.

EGBERT M. TINGLEY AND JOSEPH L. RAY, OF PITTSBURG, PENNSYLVANIA, ASSIGNORS TO WESTINGHOUSE ELECTRIC & MANUFACTURING COMPANY, A CORPORATION OF PENNSYLVANIA.

DYNAMO-ELECTRIC MACHINE.

No. 888,940.

Specification of Letters Patent.

Patented May 26, 1908.

Application filed March 17, 1905. Serial No. 250,644.

*To all whom it may concern:*

Be it known that we, EGBERT M. TINGLEY and JOSEPH LOOMIS RAY, citizens of the United States, and residents of Pittsburg, in the county of Allegheny and State of Pennsylvania, have invented a new and useful Improvement in Dynamo-Electric Machines, of which the following is a specification.

Our invention relates to dynamo-electric machines, and particularly to the rotatable members of such machines.

Our invention has for its object to provide connecting means between the rotatable winding of a dynamo-electric machine and the collector rings which shall be entirely unexposed and which shall be capable of resisting high centrifugal forces without displacement or rupture.

Heretofore, the conductors that connect the winding of the rotatable member of a dynamo-electric machine with the collector rings have been supported by blocks or bands or other suitable means upon the exterior of the shaft, forming a structure that possesses no great mechanical strength and that causes considerable air friction and noise when rotating at high speeds on account of its irregularities in form.

According to our invention, the conductors are entirely embedded in the closed recesses in the shaft, thereby providing a perfectly smooth cylindrical member having great mechanical strength.

Our invention is illustrated in the accompanying drawings, Figure 1 of which is a view, partially in longitudinal cross-section and partially in side elevation, of parts of a machine constructed in accordance therewith. Fig. 2 is a plan view of a part of the shaft of the machine shown in Fig. 1. Fig. 3 is a transverse, sectional view on line III—III of Fig. 1. Fig. 4 is a sectional view on line IV—IV of Fig. 1, and Fig. 5 is an enlarged, longitudinal, sectional view of certain parts of the machine embodying our invention.

The shaft 1 of the rotatable member 2 of a dynamo-electric machine, having a winding 3 located in suitable end grooves 4 and 5, is provided, at a suitable distance from the winding 3, with a sleeve 6 having a guard flange 7 at its outer end. Insulating bushings 8 and 9 are seated in apertures 10 and 11, with which the sleeve 6 is provided at opposite sides. The inner surface of the sleeve 6 is also provided with longitudinal grooves 12 and 13 that communicate with the apertures 10 and 11.

Conductors 14 and 15 are placed in the grooves 12 and 13, respectively, and their ends project through the apertures 10 and 11 in the sleeve 6. The sleeve 6 is wrapped with mica 16, or other suitable insulating material, and the ends of the conductors 14 and 15 are split and bent over upon the surface of the insulating material. The ends of the conductors 14 and 15 and the insulating material 16 are secured in position by means of bands 17 and 18, comprising a plurality of turns of any suitable conducting wire. Conducting slip-rings 19 and 20 are securely fitted over the bands 17 and 18 by heating and shrinking or in any other suitable manner, and the spaces between the rings 19 and 20 and at each side thereof are wrapped with any suitable sheet insulating material 21, which may be secured in position by means of twine 22. A compact and durable structure is in this manner provided, and permanent, effective connections are made between the conductors 14 and 15 and the conducting rings 19 and 20. It is intended that brushes (not shown) shall engage the slip-rings 19 and 20, thereby providing means for making connections to an external circuit.

The shaft 1 is provided with diametrically opposite, longitudinal recesses or grooves 23 and 24, which communicate, at one end, with the corresponding grooves in the sleeve 6, the sides of the recesses near the surface being provided with keyways 25. The conductors 14 and 15 are continued through the grooves 23 and 24 and connect with the winding 3 of the rotatable member 2. The conductors are retained in position in the grooves by means of short keys 26, which are adapted to fit into the keyways 25 and the top portions of the recesses 23 and 24. The sides of the recesses at the ends nearest the rotatable member 2 are not grooved, but the recesses are widened, as shown at 27, in order that the wedges 26 may be inserted into the grooves, the wedges being slightly shorter than the open portions 27 of the recesses. Tapered, rectangular wedges 28 are placed in the open portions 27 and are retained in position by means of vanes 29, which are cast integral with an end-bell 30 that is secured to the end of the rotatable member 2.

For the purpose of protecting the insulating material, with which the conductors 14 and 15 are wrapped, from injury while the keys 26 are being inserted, metallic strips 31 may be placed in the grooves over the insulating material. The conductors 14 and 15 lead from the recesses 23 and 24 through openings 32 left between the ends of the recesses and the wedges 28 and are connected with the winding 3 of the rotatable member in any suitable manner.

We claim as our invention:

1. The combination with a sleeve having one or more longitudinal recesses in its internal circumferential surface, and lateral apertures communicating therewith, of conducting rings mounted upon the sleeve over the apertures but insulated from the sleeve and from each other, and electrical conductors connected to the conducting rings and completely embedded in the recesses and apertures.

2. The combination with a sleeve having one or more longitudinal recesses in its inner circumferential surface, and lateral apertures communicating therewith, of conductors completely embedded in the said recesses the ends of which project through the apertures, and conducting rings mounted upon the sleeve over the projecting ends of the conductors.

3. The combination with a shaft having one or more longitudinal grooves, and a sleeve having one or more internal, longitudinal grooves and communicating, lateral apertures, of conducting rings mounted upon the sleeve, and conductors completely inclosed within the grooves and apertures and connected to the conducting rings.

4. The combination with a shaft having one or more longitudinal grooves, and a sleeve having one or more internal, longitudinal grooves and communicating, lateral apertures, of conductors completely inclosed within the grooves and having ends which project through the apertures in the sleeve, and conducting rings mounted upon the sleeve over the projecting ends of the conductors.

5. The combination with a shaft provided with one or more longitudinal grooves having lateral keyways and open portions, keys for the keyways, and blocks for the open portions of the grooves, of means carried by the shaft for retaining the blocks in the open portions of the grooves.

6. The combination with a shaft provided with one or more longitudinal grooves having lateral keyways and open portions, keys for the keyways and blocks for the open portions of the grooves, of a member carried by the shaft and projecting vanes therefrom that retain the blocks in the open portions of the grooves.

7. The combination with a shaft having one or more longitudinal grooves, and a sleeve mounted thereon having corresponding grooves in its internal surface and substantially radial apertures that communicate with the internal grooves, of conductors located in the grooves the ends of which project through the apertures in the sleeve, conducting rings mounted upon the sleeve over the projecting ends of the conductors, and means for securing the conductors in the grooves in the shaft.

8. The combination with a sleeve having lateral apertures, insulating material upon the sleeve, and conductors that project through the apertures and the insulating material, of conducting bands that bind the ends of the conductors upon the insulating material, and collector rings mounted upon the bands.

9. The combination with a sleeve having lateral apertures, an insulating band upon said sleeve and conductors inside the sleeve having ends that project through the sleeve apertures and the insulating band, of wire bands surrounding the conductor ends and binding them to the insulating band, and collector rings mounted upon the wire bands.

In testimony whereof, we have hereunto subscribed our names this 11th day of March, 1905.

EGBERT M. TINGLEY.
JOSEPH L. RAY.

Witnesses:
WESLEY G. CARR,
BIRNEY HINES.